June 7, 1949.                H. C. HAYES ET AL                2,472,107
                              ACOUSTICAL APPARATUS
Filed May 6, 1936                                          2 Sheets-Sheet 1
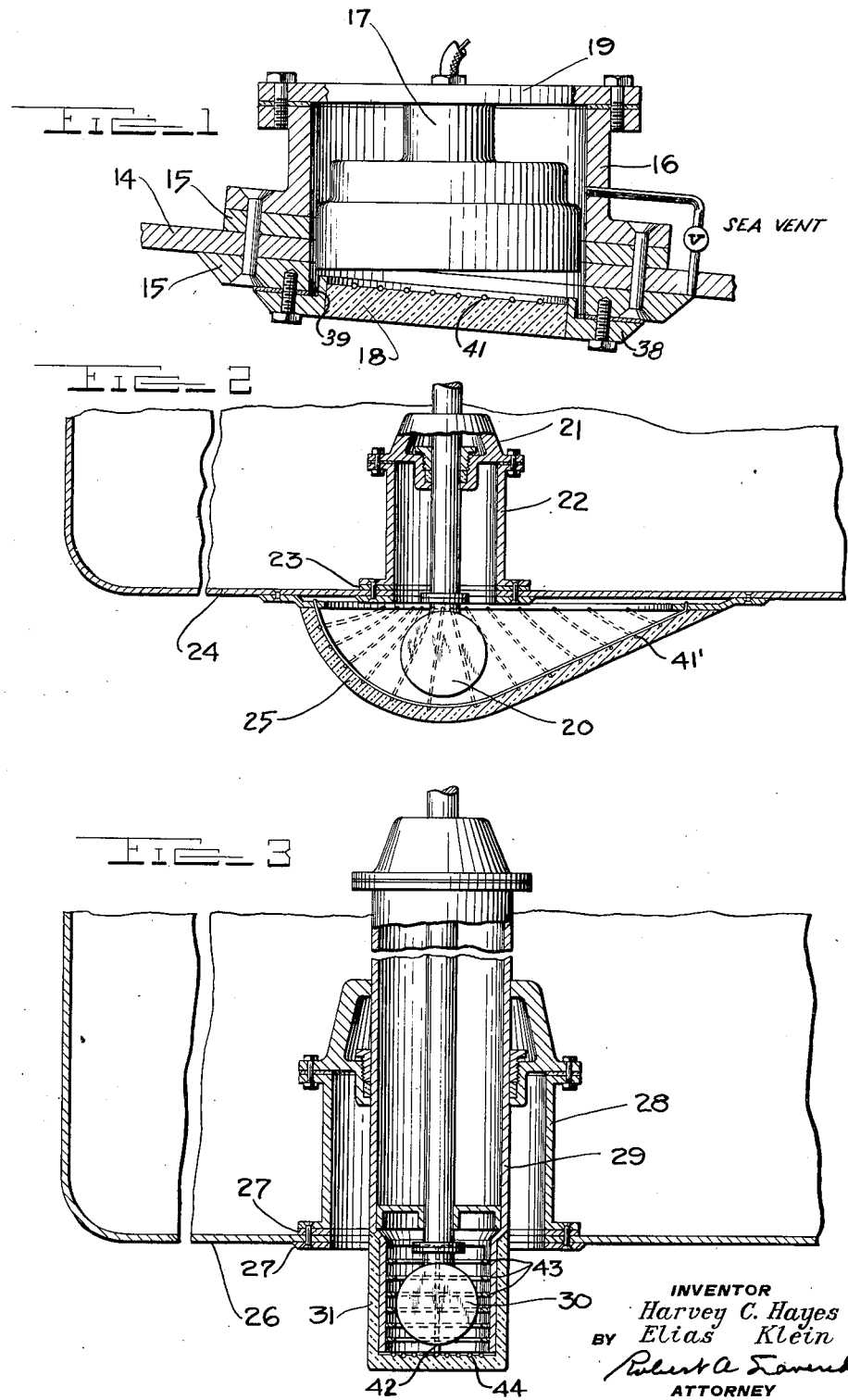
INVENTOR
Harvey C. Hayes
BY Elias Klein
ATTORNEY

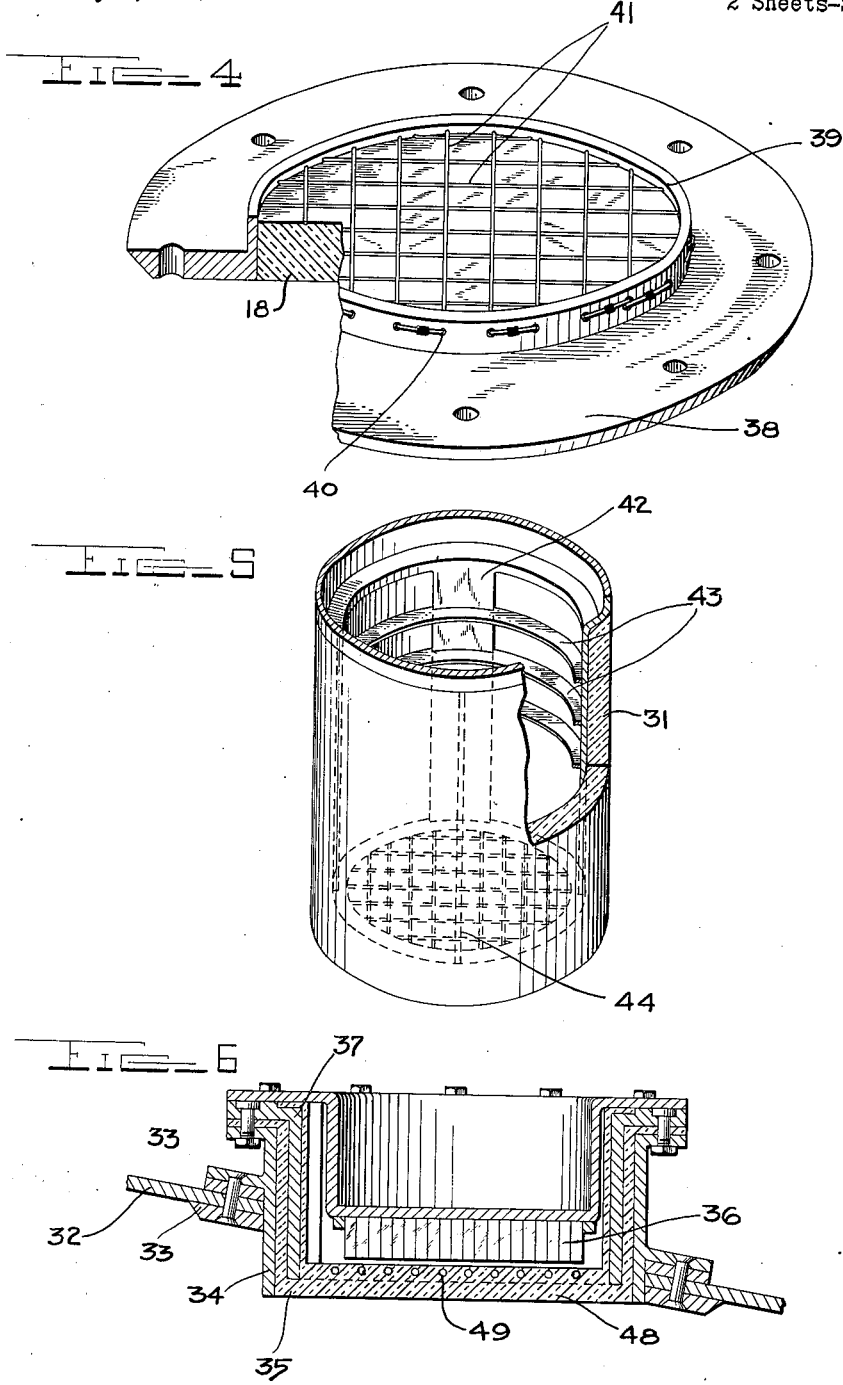

Patented June 7, 1949

2,472,107

UNITED STATES PATENT OFFICE 2,472,107

ACOUSTICAL APPARATUS

Harvey C. Hayes and Elias Klein,
Washington, D. C.

Application May 6, 1936, Serial No. 78,071

18 Claims. (Cl. 181—0.5)

(Granted under the act of March 3, 1883, as
amended April 30, 1928; 370 O. G. 757)

Our invention relates to apparatus for transmitting and/or receiving sound in a fluid medium such as water and the like.

It is an object of our invention to provide an inexpensive and effective acoustical apparatus for use in commercial and naval vessels which will make possible an inspection, repair, or replacement of the sound transmitting and/or receiving means thereof without the necessity of docking the vessel or using a diver.

Another object of our invention is the provision of a fluid impervious housing for the sound transmitting and/or receiving means which includes a window of a material of substantially the acoustic qualities of sea water and of sufficient strength and rigidity to withstand the fluid pressures encountered in use.

Still another object of our invention is the provision of a fluid impervious, sound window which is reinforced to withstand fluid pressures without appreciable impairment of the sound transparency thereof.

Other objects and many of the attendant advantages of this invention will be readily appreciated as the same becomes better understood by reference to the following description when considered in connection with the accompanying drawings, wherein:

Fig. 1 is a view in section of a shallow sea-chest type of acoustical apparatus according to our invention;

Fig. 2 is another embodiment of our invention showing in section an acoustical apparatus wherein the sound transparent window is blister shaped;

Fig. 3 shows in section a further embodiment of our accoustical apparatus which is designed for movement to points on either side of the vessel's skin;

Fig. 4 shows the preferred construction of our reinforced sound transparent window for use in connection with the acoustical apparatus of this invention;

Fig. 5 shows another form in which the reinforced sound transparent window may be made; and Fig. 6 shows in section still another embodiment of our invention wherein the acoustical apparatus is mounted adjacent the skin of the vessel.

Turning now to Fig. 1 disclosing the first embodiment of our invention, there is shown therein the apertured plating 14 of the vessel, reinforced by rings 15. A shallow cylindrical member 16 is secured in a suitable manner to the upper reinforcing ring and supports in fluid tight relation at the upper end thereof the electro-acoustical energy interchanging means 17 which may be either a sound transmitting or a sound receiving means, or a means combining both of these functions. To the lower reinforcing ring we have permanently secured a sound window 18. This window, which will be described more particularly hereinafter, has such strength and rigidity that it will withstand fluid pressures encountered in use and at the same time transmit with but little loss of energy the sound waves impinging thereon. The window 18, cylindrical member 16, and closure 19 constitute a fluid impervious housing for the sound transmitting and/or receiving means which, when in use, is normally filled with sea water and vented to the sea to thereby equalize the pressure on both sides of the window 18. When, however, for any reason it is desired to inspect the sound transmitting and/or receiving means, it is, of course, obvious that the sea vent must first be shut off by closing the valve V. Thereupon the closure 19 may be removed and access had to the sound transmitting and/or receiving means without the necessity of docking the vessel or employing a diver. The foregoing apparatus, of course, can only be used for unidirectional transmission or reception of sound as, for example, taking soundings where the direction is vertically downward.

Another class of sound transmitting and/or receiving means is designed to project the sound beam about a horizontal plane and to directly receive sounds in this plane, being for this purpose rotatably mounted about a vertical axis and having its sound active area facing horizontally. With such means the housing shown in Fig. 1 cannot be used. In Fig. 2 we have disclosed a suitable housing for such an electro-acoustical energy interchanging means. In this figure, 20 designates the sound transmitting and/or receiving means which is mounted for rotational movement about the vertical axis and for this purpose is supported in a suitable stuffing box 21; 22 is a cylindrical member supporting the aforementioned stuffing box and secured to the upper reinforcing ring 23 adjacent the aperture in the plating 24 of the vessel; and 25 is a blister shaped sound window closing the said aperture and mounted to extend well below the vessel's plating or skin so that the sound transmitting and/or receiving means 20 may directively receive or transmit sound about a horizontal plane. The reinforcing means are indicated on the drawing at 41', and, like the embodiment in Fig. 1, the fluid impervious housing formed by the window 25, cylindrical member 22, and stuffing box 21 may be filled with sea water and vented to the sea during use of the apparatus. This type of mounting possesses a number of advantages since it leaves the sound transmitting and/or receiving means 20 in a dead water space which makes it more easily operated, thereby eliminating the resulting bearing friction and a tendency of the said means to set its flat sound generating face across the lines of flow in the fluid medium. Furthermore, the window 25, if desired, may be given a streamline form, thus largely eliminating the turbulent envelope which otherwise would surround an unshielded and necessarily poorly streamlined sound transmitting and/or receiving means with attendant reduction in its acoustical efficiency.

While the window 25 shown in Fig. 2 has the advantage that it can be given a streamline form and thereby reduce the blanketing of sound and turbulence to a minimum, it also has the disadvantage of offering a permanent parasitic resistance to movements of the vessel in the fluid medium and, furthermore, may be carried away because of its location. These disadvantages may be eliminated, although at some sacrifice in streamlining, by employing a mounting for the electro-acoustical sound transmitting and/or receiving means, as shown in Fig. 3, wherein 26 is the plating or skin of the vessel, 27 reinforcing rings surrounding an aperture therein, and 28 a vertical cylindrically shaped member secured to the upper reinforcing ring 27 and movably supporting, for vertical adjustment in fluid tight relation, the tubular housing 29 inclosing the sound transmitting and/or receiving means 30, which like that shown in Fig. 2 is horizontally directive and rotatably mounted about a vertical axis. The housing 29 includes a sound transparent, fluid impervious, reinforced window 31, which by reason of the mounting of the tubular housing 29 is vertically and selectively adjustable to positions on either side of the skin or plating 26 of the vessel. The reinforcing measures more particularly described in connection with Fig. 8 are indicated herein by means of reference numerals 42, 43 and 44. Although the window in the embodiment of Fig. 3 is shown cylindrically shaped, it is apparent that it may have any other shape and preferably one that is a surface of revolution about the vertical axis of the housing to thereby insure substantial streamlining. The arrangement disclosed in Fig. 3 permits the whole sound installation to be raised to a position within the ship's skin when not in operation and when making landings or traversing shoal water. Furthermore, it constitutes a distinct improvement over the earlier devices, in that the gate valve is dispensed with.

In Fig. 6 is shown another embodiment of our invention, wherein the apertured plating of the vessel is indicated at 32, having on both sides thereof reinforcing rings 33, to the upper ring of which is secured a cylindrical member 34 for supporting the housing 35 inclosing the sound transmitting and/or receiving means designated generally by the numeral 36 and which may be electro-acoustical in nature or any other type. The housing 35 includes a metallic member 37, both sides of which are lined with the material of which the window 38 is fashioned and forms with the window a unitary and integral part to thereby insure fluidtight integrity of said housing. The window 48 is of a material which is relatively highly transparent to underwater sound, and fluid impervious, for example any known or other suitable kind of vulcanized rubber compound having a high percentage of natural rubber, reinforced by wire mesh 49 to withstand the fluid pressures encountered in use. This housing employs as a sound transferring medium castor oil or some other fluid having sound characteristics substantially the same as the material of the window and of the sea water contacting therewith, and which does not attack the material of the window.

In all the foregoing embodiments of our invention, the window through which the sound must pass must fulfill two requirements, in that it must be relatively highly transparent to underwater sound, and fluid impervious. By the term "relatively highly transparent to underwater sound" is meant that sound waves passing through the material of the window to a surrounding body of water or vice versa, are neither appreciably reflected at the boundary surface nor appreciably absorbed by the material of the window. This desideratum is attained when the acoustical properties of the window material are substantially equal to those of the fluid medium in contact therewith. The acoustical properties of two substances are alike or different, depending upon whether the product of the density and the velocity of sound in them is alike or different.

A material which we have found satisfactory for the foregoing requirements is ordinary vulcanized natural rubber. While rubber has the desirable high degree of underwater sound transparency and imperviousness to water, it does not have sufficient mechanical rigidity to withstand the outside water pressure when the dimensions of the sound window are of such a size as to be usable for practical purposes. These physical characteristics of the rubber compounds have made it necesssary to reinforce the sound window in all forms of our acoustical apparatus but yet to make the reinforcing means of such a nature that it will not appreciably impair the sound transparency of the window material.

Turning now to Fig. 4, there is disclosed therein a preferred embodiment of our sound window, wherein 38 designates a rigid apertured frame member having a projecting flange 39 which is provided with a series of perforations 40 about its circumference. The aperture of the frame member 38 is filled in with the rubber compound 18 which is vulcanized to the inner aperture walls and reinforced against fluid pressure by wire members 41, which are threaded through the aforementioned perforations in the projecting flange and spot-welded to the outer periphery thereof to thereby anchor the same securely in place. In general $\frac{1}{16}$ inch wire, such as piano steel wire, bronze wire, or the like, strung to give 1 inch mesh with rubber compound 1 inch thick will safely withstand the sea pressure of an 18 inch hole in the bottom of a ship of 30 feet draft, but it is apparent that the size and arrangement of the component window parts can be varied to suit any desired conditions.

In Fig. 5 is shown a cylindrically shaped sound transparent window including a rigid vertical spacing frame 42 of suitable material, to which is secured in spaced and superposed relation a series of annular reinforcing members 43, said rigid frame member having additional reinforcement at the lower end 44 thereof, which may be a wire mesh or equivalent means. The entire reinforcing means is enveloped by a thick layer 31 of rubber, the reinforcing means, like that in the window of Fig. 4, being so designed as to interfere but inappreciably with the sound transparency of the window material.

According to the provisions of the patent statutes, we have set forth the principal mode of operation of our invention and have illustrated and described what we now consider to represent its best embodiments. However, we desire to have it understood that within the scope of the appended claims the invention may be practiced otherwise than as specifically illustrated and described.

The invention described and claimed herein may be manufactured and used by or for the Government of the United States of America for governmental purposes, without the payment of any royalties thereon or therefor.

We claim:

1. An electro-acoustical apparatus comprising in combination an electro-acoustical energy interchanging means, a fluid impervious housing for said means, said housing including a reinforced, sound window of a material having substantially the same velocity of propagation of compressional wave energy constant as sea water.

2. In a vessel operable for movements in a fluid medium, an electro-acoustical energy interchanging means, a fluid impervious housing for said means, including a fluid-pressure resisting, sound window, said window comprising a reinforcing means in association with a material having substantially the same velocity of propagation of compressional wave energy constant as the fluid medium in contact therewith.

3. In a vessel operable for movements in a fluid medium, an electro-acoustical energy interchanging means, a fluid impervious housing for said means, including a fluid-pressure resisting, sound window, said window extending well below the vessel's skin and comprising a reinforcing means in association with a material having substantially the same velocity of propagation of compressional wave energy constant as the fluid medium in contact therewith, the electro-acoustical energy interchanging means being horizontally directive and rotatably mounted for movement about a vertical axis.

4. In a vessel operable for movements in a fluid medium, an electro-acoustical energy interchanging means, a fluid impervious housing for said means, including a streamlined, fluid-pressure resisting, sound window, said window extending well below the vessel's skin and comprising a reinforcing means in association with a material having substantially the same velocity of propagation of compressional wave energy constant as sea water, the electro-acoustical energy interchanging means being horizontally directive and rotatably mounted for movement about a vertical axis.

5. In a vessel operable for movements in a fluid medium, an electro-acoustical energy interchanging means, a fluid impervious housing for said means including a fluid-pressure resisting, sound window, said window comprising a reinforcing means in association with a material having substantially the same velocity of propagation of compressional wave energy constant as sea water, the electro-acoustical energy interchanging means being horizontally directive and rotatably mounted for movement about a vertical axis and the fluid impervious housing being vertically adjustable to selectively position the sound window thereof at points on either side of the vessel's skin.

6. In a vessel operable for movements in a fluid medium, an electro-acoustical energy interchanging means, a fluid impervious housing for said means including a fluid-pressure resisting, sound window, said window comprising a reinforcing means in association with a material having substantially the same velocity of propagation of compressional wave energy constant as sea water, the electro-acoustical energy interchanging means being horizontally directive and rotatably mounted for movement about a vertical axis and the fluid impervious housing being vertically adjustable to selectively position the sound window thereof at points on either side of the vessel's skin, said sound transparent window having a contour in contact with the fluid medium which is that of a surface of revolution about the vertical axis of rotation of the electro-acoustical energy interchanging means.

7. In a vessel operable for movements in a fluid medium, an electro-acoustical energy interchanging means, a fluid impervious housing for said means including a cylindrically shaped, fluid-pressure resisting window, said sound window comprising a reinforcing means in association with a material having substantially the same velocity of propagation of compressional wave energy constant as sea water, the electro-acoustical energy interchanging means being horizontally directive and rotatably mounted for movement about a vertical axis and the fluid impervious housing being vertically adjustable to selectively position the sound transparent window thereof at points on either side of the vessel's skin.

8. An electro-acoustical apparatus operable for movements in a fluid medium comprising in combination an electro-acoustical energy interchanging means, a fluid impervious housing for said means including a fluid-pressure resisting, sound window, said window comprising a reinforcing means in association with a material having a density and sound velocity transmission characteristic substantially equal to that of the fluid medium in contact therewith, the walls of said housing extending rearwardly from said window being lined both interiorly and exteriorly with the material used in shaping the window and forming therewith a unitary structure whereby to insure fluidtight integrity of said housing.

9. An electro-acoustical apparatus operable for movements in a fluid medium comprising in combination an electro-acoustical energy interchanging means, a fluid impervious housing for said means including a fluid-pressure resisting, sound window, said window comprising a reinforcing means in association with a rubber compound having a density and sound velocity transmission characteristic substantially equal to that of the fluid medium in contact therewith, the walls of said housing extending rearwardly from said window being lined both interiorly and exteriorly with the rubber compound used in shaping the window and forming therewith a unitary structure whereby to insure fluidtight integrity of said housing.

10. A fluid impervious housing for inclosing electro-acoustical energy interchanging means, said housing including a reinforced sound window of a material having substantially the same velocity of propagation of compressional wave energy constant as sea water.

11. A fluid impervious housing for inclosing electro-acoustical energy interchanging means and operable for movements in a fluid medium, said housing including a fluid pressure resisting, sound window which comprises a reinforcing means in association with a material having substantially the same velocity of propagation of compressional wave energy constant as the fluid medium in contact therewith.

12. A fluid impervious housing for inclosing electro-acoustical energy interchanging means and operable for movements in a fluid medium, said housing including a fluid pressure resisting, sound window which comprises a reinforcing means in association with rubber, the walls of said housing extending rearwardly from said window being lined both interiorly and exteriorly with the rubber used in fashioning the window and forming therewith a unitary structure whereby to insure fluidtight integrity of said housing.

13. A fluid pressure resisting, sound window for use with acoustical apparatus comprising in combination a rigid apertured frame member having vulcanized rubber in the aperture thereof, and means secured to said frame member for reinforcing the rubber without appreciably impairing the sound transparency thereof.

14. A fluid pressure resisting, sound window for use with acoustical apparatus comprising in combination a rigid frame member including a projecting flange having a series of perforations therein, said frame member being provided with an aperture which is filled with rubber, and means extending through the perforations of said projecting flange and secured to the periphery thereof for reinforcing the rubber without appreciably impairing the sound transparency thereof.

15. A fluid pressure resisting, sound window for use with acoustical apparatus comprising in combination a cylindrically shaped body of rubber closed at one end and means within said body for reinforcing the same without appreciably impairing the sound transparency thereof.

16. A fluid pressure resisting, sound window for use with acoustical apparatus comprising in combination a cylindrically shaped body of rubber closed at one end and means within said body for reinforcing the same without appreciably impairing the sound transparency thereof, said means including a spacer frame holding a series of annular members in spaced superposed relation.

17. In combination with an acoustical apparatus, which projects through the underwater surface skin of a vessel, a fluid impervious member of rubber positioned to seal said acoustical apparatus from the water medium, said member being reinforced by a grid element of a strength and rigidity to withstand the fluid pressure encountered thereon, whereby the interior side of the said sealing member may be exposed to the relatively lower pressure of the interior of the vessel to permit removal of the acoustical apparatus within the vessel for inspection or repair without injury to the sealing member.

18. A submarine signaling device comprising signal translating means, and a housing for said means, said housing including a rigid openwork framework, the openings in which constitute of the order of 75 per cent of the total area, and a covering on said framework of a sheet of material having substantially the same velocity of propagation of compressional wave energy constant as sea water.

HARVEY C. HAYES.
ELIAS KLEIN.

REFERENCES CITED

The following references are of record in the file of this patent:

UNITED STATES PATENTS

| Number | Name | Date |
| --- | --- | --- |
| 1,008,340 | Howes | Nov. 14, 1911 |
| 1,345,717 | Thomas | July 6, 1920 |
| 1,401,024 | Wood et al. | Dec. 20, 1921 |
| 1,563,626 | Hecht et al. | Dec. 1, 1925 |
| 1,715,831 | Hahnemann | June 4, 1929 |